(12) United States Patent
Marty et al.

(10) Patent No.: US 8,628,634 B2
(45) Date of Patent: Jan. 14, 2014

(54) METHOD OF BONDING A FILM TO A CURVED SUBSTRATE

(75) Inventors: Antoine Marty, Saint-Orens (FR); Paul Lefillastre, Charenton le Pont (FR)

(73) Assignee: Essilor International (Compagnie Generale d'optique), Charenton le Pont (FR)

( * ) Notice: Subject to any disclaimer, the term of this patent is extended or adjusted under 35 U.S.C. 154(b) by 761 days.

(21) Appl. No.: 12/303,990

(22) PCT Filed: Jun. 7, 2007

(86) PCT No.: PCT/EP2007/055631
§ 371 (c)(1),
(2), (4) Date: Mar. 3, 2011

(87) PCT Pub. No.: WO2007/144308
PCT Pub. Date: Dec. 21, 2007

(65) Prior Publication Data
US 2011/0146893 A1    Jun. 23, 2011

(30) Foreign Application Priority Data

Jun. 13, 2006  (FR) .................................... 06 05247

(51) Int. Cl.
  *B29C 51/10* (2006.01)
  *B29C 53/04* (2006.01)
  *B29C 65/02* (2006.01)

(52) U.S. Cl.
  USPC ........................ 156/212; 156/214; 156/285

(58) Field of Classification Search
  None
  See application file for complete search history.

(56) References Cited

U.S. PATENT DOCUMENTS

| 3,264,157 A | 8/1966 | Lattimer |
| 4,242,162 A | 12/1980 | Edwards et al. |
| 2008/0314499 A1 | 12/2008 | Begon et al. |

FOREIGN PATENT DOCUMENTS

WO    2006/013250    2/2006

*Primary Examiner* — Barbara J Musser
(74) *Attorney, Agent, or Firm* — Occhiuti & Rohlicek LLP

(57) ABSTRACT

A method of bonding a film (2) to a curved substrate (1) comprises preforming the film by applying a pneumatic pressure difference between two sides of the film and by heating said film. An intermediate shape is then conferred on the film, which is suitable for applying the film against a curved face of the substrate. This application is carried out, on the one hand, by keeping the film m the intermediate shape by means of an adjusted pressure difference applied between the two sides of the film and, on the other hand, by pressing the substrate against the film by means of a movable support (12-14). Such a method is used to obtain a defect-free ophthalmic lens with a film bonded to it.

17 Claims, 3 Drawing Sheets

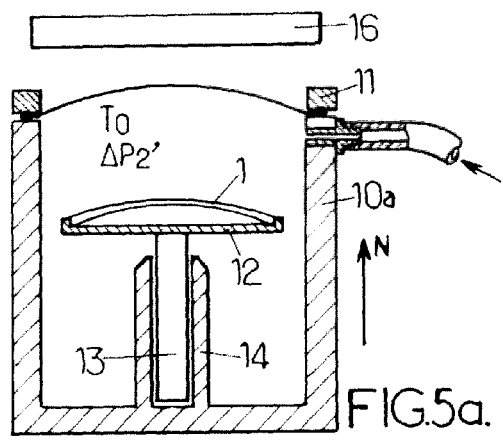
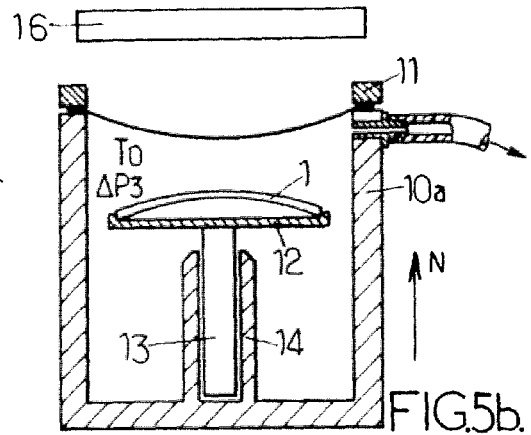
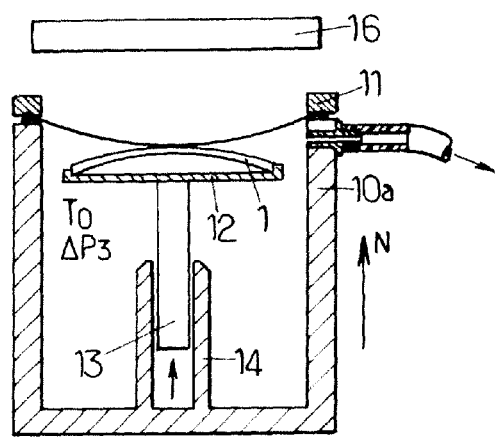
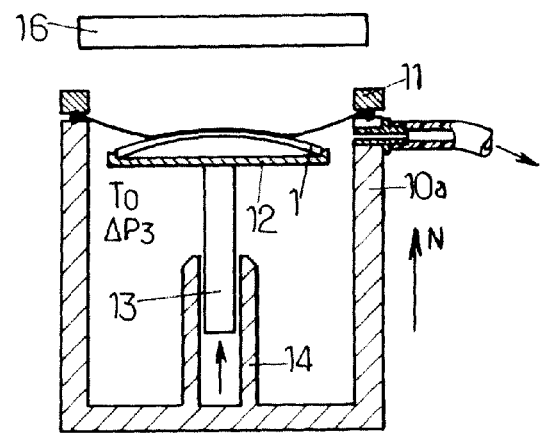
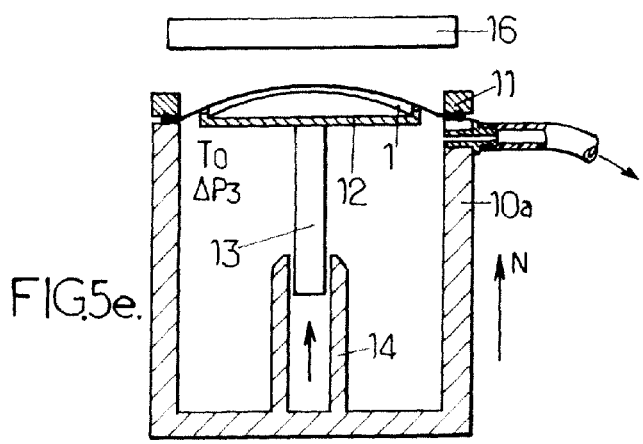

METHOD OF BONDING A FILM TO A CURVED SUBSTRATE

CROSS-REFERENCE TO RELATED APPLICATIONS

This application is the National Stage of International Application No. PCT/EP2007/055631, filed on Jun. 7, 2007, which claims the priority of French Application No. 0605247, filed on Jun. 13, 2006. The contents of both applications are hereby incorporated by reference in their entirety.

The present invention relates to a method of bonding a film to a curved substrate. It also relates to a device designed to implement such a method.

It is often useful to bond a film to a curved face of an optical lens or a spectacle lens to obtain a lens that possesses a desired property. For example, the film may be a polarizing film, a contrast-enhancing film, a photochromic film, etc. Given that the face of the lens is curved, it is not possible to apply the film directly to the lens when the film has an initial shape that is plane. This is because delaminations, tearing and/or pleats then appear, which are due to the difference in curvature between the film and the face of the lens. It is therefore necessary to preform the film in order to give it an appropriate initial curvature before applying it to the lens.

Usually, the film is preformed by thermoforming, by pressing a pad onto one side of the film so that the face of the film that is located on the same side as the pad becomes concave and the other face of the film becomes convex. The film may have been heated beforehand, to make it more flexible when it is deformed by the pad. However, such a preforming method generates large stresses in certain parts of the film, essentially in peripheral parts of the latter, which result in local stretching or even tearing of the film. Furthermore, that face of the film against which the pad is pressed is often damaged, owing to the rubbing that occurs between this face and the pad. It has microscratches that may be visible or may cause light scattering. Finally, particles and dirt may also be encrusted in the film by the pad during the preforming.

One object of the present invention therefore consists in proposing a novel method of bonding a film to a curved substrate, for which the stresses generated in the film are reduced, and which does not create surface defects in the film.

To this end, the invention proposes a method of bonding a film having a substantially plane initial shape to a curved face of a substrate, the method comprising the following steps:
  a) when the film is at a temperature above 40° C., a peripheral edge of the film is held firmly and a pneumatic pressure difference is applied between two sides of the film until an application face of this film becomes curved with a curvature greater than an average curvature of the face of the substrate;
  b) when the temperature of the film has dropped below 40° C., the pneumatic pressure difference applied between the two sides of the film is adjusted so that the curvature of the application face of the film becomes approximately equal to or less than the curvature of the face of the substrate; and
  c) while maintaining the pneumatic pressure difference adjusted at step b), the face of the substrate is pressed against the application face of the film until complete contact is established between the film and the face of the substrate, a layer of an adhesive being placed between the film and the substrate.

Thanks to the layer of adhesive used in step c), a method according to the invention bonds the film to the substrate. The assembly obtained is then permanent and provides an element that combines the respective properties of the film and of the substrate. In this assembly element, the film is bonded to the curved face of the substrate, with that face of the film called the application face turned towards the substrate. The film may give the assembly an optical property, such as coloration, a polarizing power, photochromic behaviour, etc., or surface properties, such as hydrophobic behaviour, an anti-soiling effect, protection against scratches, etc.

According to the invention, the method includes a first step a) of preforming the film, which is carried out by applying a pneumatic pressure difference between the two faces of the film. Such preforming has at least two advantages. Firstly, the stresses that are generated in the film, in order to give it a curved shape, are well distributed and consequently not very likely to form localized stretching or tearing of the film. Secondly, the film is held in place by its peripheral edge and the deformation of the film is created by a larger gas pressure that is applied on one side of the film. No solid object, which could have for example a counter-form function, is therefore in contact with the central part of each face of the film during preforming. In this way, no scratching of the film occurs, nor is any foreign particle encrusted in the faces of the film.

In addition, thanks to the use of a pneumatic pressure difference to preform the film, the temperature of the latter may be precisely controlled during preforming, especially relative to the glass transition temperature of the film. In this way, the shape conferred on the film before it is assembled with the substrate may also be well controlled, while still ensuring that the temperature of the film during step a) remains below a limit temperature above which the film could be degraded. By controlling the temperature it is possible in particular on the one hand, to extend, where appropriate, the phase during which the film undergoes plastic flow and, on the other hand, to avoid quenching, which together contributes to minimizing, during assembly, the residual stresses of thermo-mechanical origin.

Furthermore, step c) is carried out using two independent control means: the pneumatic pressure difference applied between the two sides of the film on the one hand, and a means for pressing the substrate against the film on the other. In this way, the film is held in place by the pressure difference with the shape that is given to it in step b) while the bonding is taking place. Thus, no unintentional displacement of the film occurs, so that the bonding may be carried out with precise alignment of the film and the substrate that face each other.

A method according to the invention therefore makes it possible to obtain an assembly, consisting of the substrate and the film, which has very good optical quality. Such quality is compatible with many applications of the substrate provided with the film. In particular, the method is compatible with ophthalmic applications. The substrate may therefore be an optical lens, an ophthalmic lens, a lens for sunglasses, etc.

According to a first way of implementing the invention, which is suitable when the face of the substrate is convex, the pneumatic pressure difference is applied between the two sides of the film in step a) so that the application face of the film becomes concave with a curvature greater than the curvature of the face of the substrate. Next, in step b), the pneumatic pressure difference is reduced so that the application face of the film remains concave and the curvature of the latter becomes less than the curvature of the face of the substrate. Then, in step c), contact between the film and the face of the substrate, via the layer of adhesive, may be initiated in a central zone of the film and of the substrate. The contact zone then grows progressively and radially as the substrate is applied with an increasing force against the film until the contact zone corresponds to the entire face of the substrate. In this way, no bubble is formed between the substrate and the film during bonding, since the bonding is carried out by expelling the air from the centre towards the peripheral edge of the film.

According to a second way of implementing the invention, the pneumatic pressure difference applied between the two sides of the film in step a) is such that the application face of the film also becomes concave with a curvature greater than the curvature of the face of the substrate. Step b) then comprises the following two substeps:

b1) when the temperature of the film has dropped below 40° C., the pneumatic pressure difference applied between the two sides of the film is reduced so that the application face of the film remains concave and the curvature of the application face becomes substantially equal to the curvature of the face of the substrate; and then b2) the pneumatic pressure difference is modified by reversing the sign of this pressure difference between the two sides of the film so that the application face of the film becomes convex.

This second method of implementation is suitable when the substrate face is convex or concave. In particular, when it is convex, the application face of the film becomes concave again when the face of the substrate is progressively pressed against the application face of the film in step c). In this way, the bonding of the film to the substrate is again initiated in a central zone, which propagates radially into an increasingly large zone. Thus, the bonding obtained is again free of bubbles.

The invention also relates to a device suitable for implementing a bonding method as described above. Such a device comprises:

a sealed chamber provided with a system for fastening the peripheral edge of the film so as to hermetically seal this chamber with the film;

means for heating the film and means for controlling the temperature of the film, which is fastened to the chamber;

means for varying the pneumatic pressure inside the chamber and means for controlling this pneumatic pressure relative to the pressure outside the chamber;

a substrate support placed in the chamber; and means for moving the substrate support inside the chamber, which are designed to press the substrate against the film.

Such a device is particularly advantageous when it makes it possible to carry out steps a) to c) without demounting or handling the film between two of these steps. In this way, any risk of the film being scratched or damaged is reduced. This is because, steps a) and b) may be carried out by actuating the means for varying and controlling the pneumatic pressure inside the chamber on the one hand, and the temperature of the film on the other hand, and step c) is carried out by actuating the means for moving the substrate support.

Advantageously, the device may further include an automatic control system designed to actuate both the means for varying and controlling the pneumatic pressure inside the chamber, the means for varying and controlling the temperature of the film, and finally the means for moving the substrate support. It is therefore possible to mass-produce composite elements consisting of a film bonded to a substrate, in a reproducible, inexpensive and high-quality manner.

Other features and advantages of the present invention will become apparent in the following description of non-limiting exemplary embodiments with reference to the appended drawings in which:

FIGS. 5a-5e illustrate a second way of implementing the invention.

For the sake of clarity of the figures, the dimensions of the elements shown are not in proportion with actual dimensions or ratios of actual dimensions. Furthermore, identical references in the various figures denote identical elements, while N denotes a fixed direction that is repeated in several figures.

Figure 1:
FIG. 1 is a sectional view of a substrate that can be used for implementing the invention.

As shown in FIG. 1, a substrate 1 consists of an ophthalmic lens. This lens may be a spectacle lens blank, that is to say one that has not yet been cut to the dimensions of a frame for the purpose of being fitted into it. The lens 1 may consist of any material commonly used in the ophthalmic field, this being a mineral material, an organic material or possibly a composite. It may be a correcting or non-correcting lens, for example of the unifocal, bifocal, trifocal or progressive type. This lens may optionally be bulk-tinted. It will be understood that the invention is independent of the type of lens used. S1 denotes the convex face of the lens 1, or the rear face with reference to the position of the lens when it is used by a person wearing spectacles.

It will be recalled that two curvatures are defined at each point on a surface, which are equal to the inverse of the respective radii of two circles tangential to the surface along two perpendicular directions. Thus, one curvature is defined by a positive number, and the resulting concavity may be directed on one side of the surface or on the other. Hereafter, the term "average curvature of the face S1" is understood to mean an average value of all the curvatures thus defined at all the points on the face S1. This average curvature is denoted in abbreviated form as the curvature of the face S1. Within the context of the invention, this curvature may correspond to the values used in ophthalmics, in particular to correct various ametropias. For example, the average curvature of the face S1 may be equal to 6 dioptres, but the invention may be applied when the face S1 has a higher curvature.

Figure 2A:
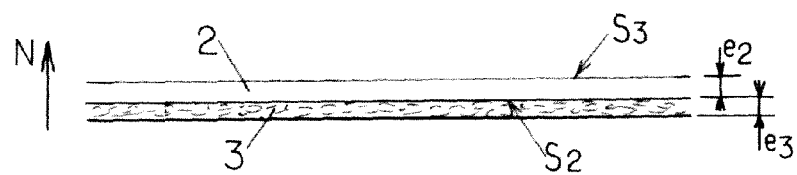
FIGS. 2a-2d are respective sectional views of films that can be bonded to the substrate of FIG. 1 according to the invention.

As shown in FIG. 2a, a continuous film 2 is covered with a layer of adhesive on one of its faces. The faces of the film 2 may be parallel. The face bearing the layer 3 is referenced S2 and is intended to be turned towards the lens 1 when the film 2 is applied against the face S1 of the lens 1. For this reason, it is called the application face. That face of the film 2 on the opposite side from the face S2 is referenced S3 and is called the external face, in relation to its position in the final assembly of the film 2 with the lens 1. The film 2 may have a thickness $e_2$ which is between 10 and 500 µm (microns), for example equal to about 75 µm, and the layer 3 may have a thickness $e_3$ which is between 10 and 100 µm, for example equal to about 25 µm. The film 2 and the layer 3 are preferably transparent. The film 2 may be based on polyethylene terephthalate or PET, cellulose triacetate or CTA, polyvinyl alcohol or PVA, a polyimide, polyethylene naphthalate or PEN, or polycarbonate. The film 2 may also have a structure based on several superposed layers adhering to one another.

The layer of adhesive 3 may be arranged on the application face S2 of the film 2 before the latter is applied against the lens 1. Alternatively, the film 2 may be placed on the face S1 of the lens 1, or both on the faces S1 and S2 of the lens 1 and of the film 2 respectively, depending on the nature of the adhesive used. This adhesive may comprise a pressure-sensitive adhesive or PSA, or a UV-curable or heat-curable adhesive. In particular, this may be an acrylic-based or silicone-based PSA. Such adhesives are assumed to be known per se, and their description and use will not be discussed further here. Alternatively, the adhesive of the layer 3 may also comprise a latex or a polyurethane. It may be deposited on the film 2 using one of the known methods, among which mention may be made of spin coating, dip coating, spreading by means of a blade, etc.

The film 2 may have by itself an optical effect. This is the case in particular of a polarizing film, a tinted film, a colour-contrast-enhancing film, a filter-forming film or a photochromic film.

Figure 2B:
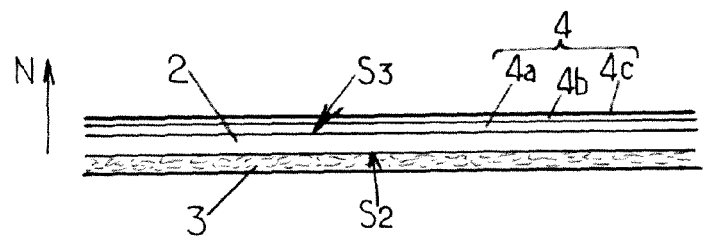

The film 2 may also serve as a support for one or more functional coatings that may be arranged on the external face S3. Such coatings may be intended to give the optical element additional functions such as, for example, an anti-reflection function, an anti-soiling function, an anti-scratch function, a hydrophobic function or a combination of these. As an example, the film 2 of FIG. 2b has, on its face S3, a layer structure 4 that comprises an anti-reflection coating 4a, an anti-scratch coating 4b and a hydrophobic coating 4c.

Figure 2C:
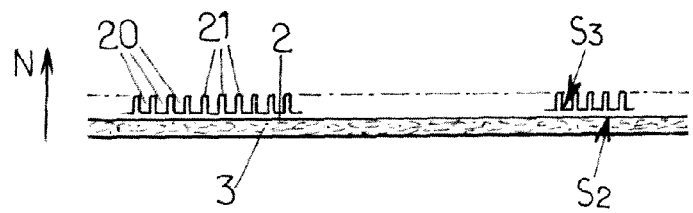
Figure 2D:
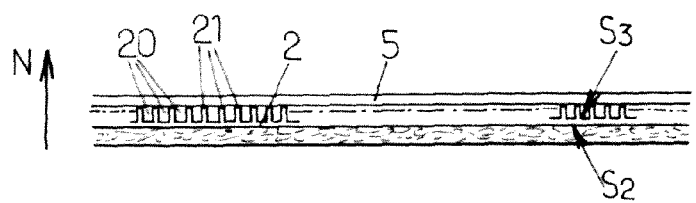

The film 2 may also include an array of cells 20 that are juxtaposed parallel to one face of the film. Neighbouring cells of this array are separated by walls 21 substantially perpendicular to the face of the film. Each cell 20 forms a cavity that is able to contain a substance introduced into it. The cells 20 may be placed in a regular or irregular manner beside one another. In particular, they may form a hexagonal lattice. In FIG. 2c, the film 2 is in a state ready to be bonded to the lens 1, while the cells 20 are still empty. Alternatively, FIG. 2d shows a film 2 containing cells, in which the cells 20 have been filled beforehand with a substance and then hermetically sealed by an additional film 5. The film 5 is fastened to the tops of the walls 21. In this case, the film 2 is assembled with the lens 1, whereas the substance has already been introduced into the cells 20. The substance contained in the cells 20 may have, in a non-limiting manner, a variable optical refractive index, especially an index that can be subsequently adjusted by irradiation. This may also be a photochromic substance, an active substance based on liquid crystals, an electrochromic substance, etc. Such films are described in particular in Patent Application WO 2006/013250.

A device that is particularly adapted for implementing a bonding method according to the invention will now be described. This device requires a particularly small number of operations for handling the film 2 and the lens 1. Furthermore, its use is rapid and simple, and the assembly obtained has an optical quality compatible with an ophthalmic application.

Figure 3:
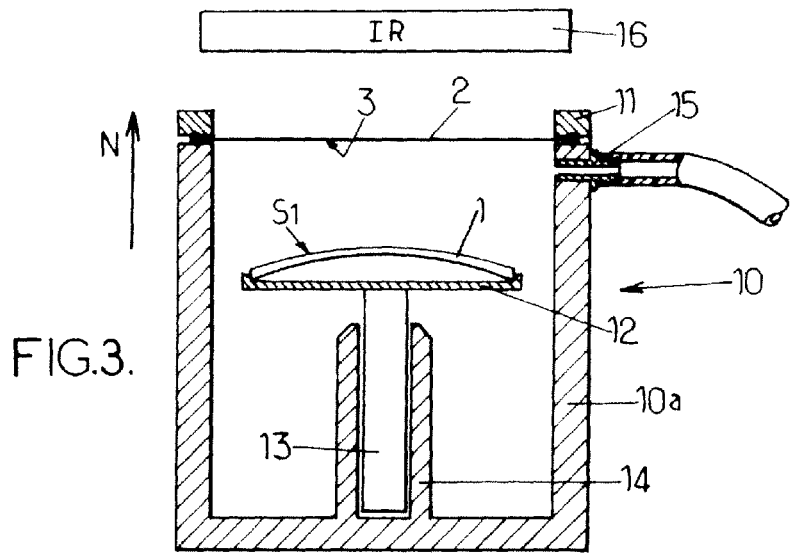
FIG. 3 is a sectional view of a device suitable for implementing a bonding method according to the invention.

As shown in FIG. 3, a chamber 10, for example of cylindrical shape and vertical axis, is open on its upper face. A lateral wall 10a of the chamber 10 is provided at its upper end with a system for fastening a film in order to seal off the chamber 10. This fastening system may include a sealing means such as, for example, an O-ring seal intended to be compressed between the lateral wall 10a and a peripheral edge of the film by a fastening ring 11, using clamping screws (not shown).

A lens support 12 is placed in the chamber 10 on the end of a cylinder 13. The cylinder 13 is combined with a piston 14 so as to allow the support 12 to rise inside the chamber 10, beyond the level of the fastening ring 11. The displacement of the support 12, by means of the cylinder 13 and the piston 14, is controlled from outside the chamber 10 using for example an electrical or hydraulic control means. Such a remote control means is assumed to be known and it will not be described further here.

The chamber 10 is provided with an orifice 15 which is connected via a suitable duct to an external gas source (not shown). This source makes it possible to establish a controlled pneumatic pressure inside the chamber 10. Thus, the inside of the chamber 10 may be at a higher pressure or lower pressure relative to the ambient pressure that exists outside the chamber 10. The pressure in the chamber 10 may be varied and controlled independently of the position and of the displacement of the support 12. In other words, the pressure in the chamber 10 and the position of the support 12 are adjusted by separate controls.

Finally, a heating system 16 is placed above the chamber 10, facing the closure film of the chamber. An infrared radiation heating system allows particularly simple and rapid use, but as an alternative other heating systems may be used.

Advantageously, the heating system 16, the pressure inside the chamber 10 and the position of the piston 14 are controlled by a programmable controller that carries out a sequence of variations of the various parameters of the device in order to carry out bonding according to the invention.

The lens 1 is installed on the support 12 with the face S1 facing upwards. The support 12 is then brought into a low position inside the chamber 10. The film 2 is fastened to the chamber 10 by means of the ring 11, with the face S2 bearing the layer of adhesive 3 turned towards the inside of the chamber. In this configuration, the face S1 of the lens 1 is at a certain distance below the face S2 of the film 2, and the chamber 10 is hermetically sealed by the film 2.

A first method of operation will now be described, which is suitable when the surface S1 of the lens 1 is convex.

Figure 4A:
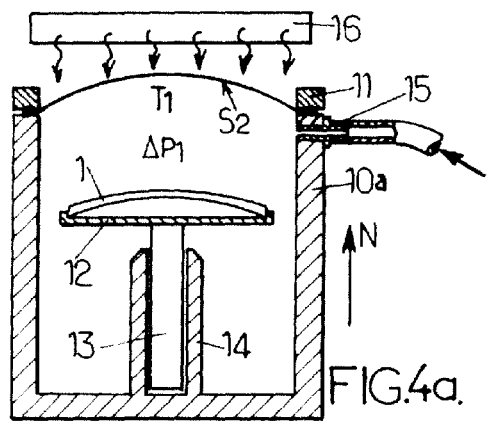
FIGS. 4a-4d illustrate a first way of implementing the invention.

During a first step, the pressure inside the chamber 10 is increased so as to create a pneumatic pressure difference $\Delta P_1$ between the two sides of the film, which pressure difference is between 0.1 bar and 4.0 bar, preferably between 0.1 bar and 1.0 bar. The pressure outside the chamber 10 is the atmospheric pressure and the chamber 10 is pressurized. During this step, the film 2 is heated by means of the system 16, in order to make it more flexible and more extensible. The temperature $T_1$ of the film 2 is then between 80° C. and 180° C. Optionally, it may be advantageous to heat the film 2 before increasing the pressure in the chamber 10, and to continue heating so as to maintain the temperature of the film 2 while the pressure in the chamber 10 is being increased. The film 2 then adopts an approximately spherical shape by being inflated towards the outside of the chamber 10, as illustrated in FIG. 4a.

Figure 4B:
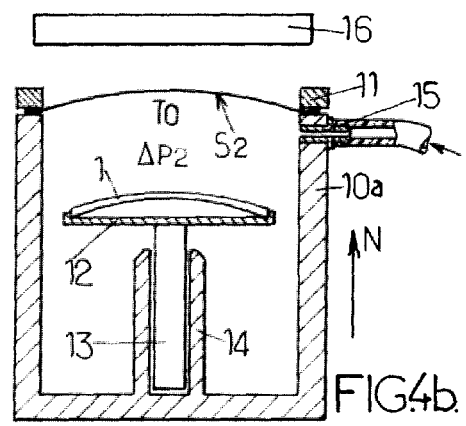

The heating of the film is then stopped and the temperature of the film 2 is returned to a value approximately equal to the ambient temperature $T_0$, between 10° C. and 40° C. During a second step, the pressure inside the chamber 10 is reduced so as to obtain a pneumatic pressure difference $\Delta P_2$ between the two sides of the film 2 that is between 0.05 bar and 0.3 bar. The chamber 10 is thus kept continuously pressurized. Owing to the partially elastic behaviour of the film 2, the inflation of the film 2 towards the outside of the chamber 10 decreases. The overpressure $\Delta P_2$ is selected so that the curvature of the film 2 becomes slightly less than the curvature of the convex face S1 of the lens 1 (FIG. 4b). These first and second steps constitute the preforming of the film 2 to an intermediate curvature between the initially zero curvature of the film 2 and the curvature of the face S1 of the lens 1.

Figure 4C:
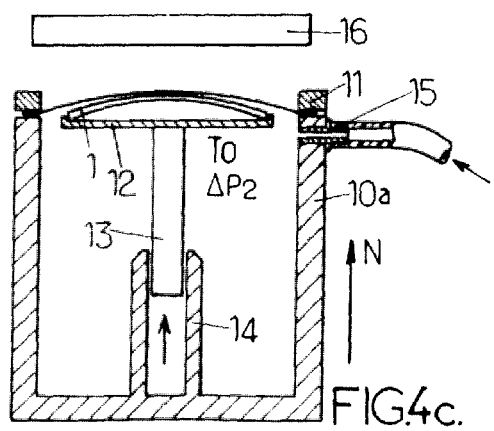
Figure 4D:
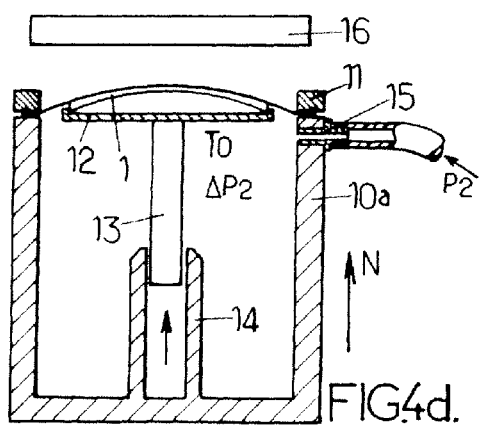

During a third step, the piston 13 is raised so that the face S1 of the lens 1 comes into contact with the layer of adhesive 3 which is present on the face S2 of the film 2. Owing to the respective curvatures of the two faces S1 and S2, contact firstly occurs at the centre of the lens 1 (FIG. 4c) and then extends radially as the piston 13 continues to rise. The face S1 of the lens 1 therefore pushes the film 2 towards the outside of the chamber 10, beyond the position of the film before the piston 13 started to rise. The face S1 of the lens 1 is thus progressively pressed against the face S2 of the film 2, with a rate of relative movement that may be between 0.1 and 1.0 mm/s. An upper limit value of this speed depends on the plastic behaviour of the film 2. In this way, the film 2 adopts the shape of the face S1 without forming a pleat or a tear (FIG. 4d). During this third step, the temperature of the film is constant, remaining for example equal to the ambient temperature.

The lens 1 may be held pressed against the film 2 for a hold time that may be between 0.5 seconds and 2 minutes. The overpressure in the chamber 10 is then removed, the cylinder 13 is lowered again, and the fastening ring 11 is removed. The lens 1 is then recovered, with the film 2 bonded to the face S1. When the layer 3 consists of a curable adhesive, the lens 1 and the film 2 are exposed to UV radiation or to a heat flux so as to permanently fix the bonding. Optionally, this exposure step may be performed before the lens 1 and the film 2 are removed from the chamber 10, while the overpressure $\Delta P_2$ is still applied.

The lens 1 can then be trimmed. During this operation, peripheral parts of the lens 1 and of the film 2 are simultaneously removed, and a spectacle lens is obtained in which the film 2 and the face S1 of the lens 1 have identical dimensions.

A second operating method may be implemented based on the configuration corresponding to FIG. 4a. The film 2 is then cooled substantially down to the ambient temperature $T_0$, but the overpressure in the chamber 10 is now adjusted so that the film 2 adopts a curvature substantially identical to that of the face S1 of the lens 1 (FIG. 5a). The overpressure inside the chamber 10, denoted by $\Delta P_2'$, may again be between 0.05 bar and 0.3 bar, but is slightly above the value $\Delta P_2$ of the first operating method, all other things being identical.

During an additional step illustrated by FIG. 5b, the inside of the chamber 10 is under reduced pressure compared with the outside of the chamber, which remains at atmospheric pressure. The curvature of the film 2 is then reversed and the film 2 expands towards the inside of the chamber 10. The face S2 of the film 2 is then convex. During this third step, the pneumatic pressure difference applied between the two sides of the film 2, denoted by $\Delta P_3$, may be between 0.05 bar and 0.5 bar in absolute value, corresponding to a reduced pressure obtained by suction through the orifice 15.

The piston 13 is raised while the film 2 remains at the temperature $T_0$ and the pressure difference is maintained at the value $\Delta P_3$. The faces S1 and S2 of the lens 1 and the film 2 respectively come into contact in the central zone of the lens 1 (FIG. 5c). The contact zone between the lens 1 and the film 2, via the layer 3, then extends radially as the piston 13 rises. The face S1 of the lens 1 then pushes the film 2 towards the outside of the chamber 10. When the face 51 of the lens 1 is convex, the face S2 of the film 2 becomes concave again while the face S1 is progressively pressed against the face S2. The film 2 thus resumes the direction of the curvature acquired initially during the first step of the method, illustrated in FIG. 5a. FIG. 5d shows the configuration of the film 2 when the contact zone between the lens 1 and the film 2 has not yet reached the entire face S1. The curvature of the film 2 is reversed at the limit of the contact zone between the film and the lens, while this contact zone continues to increase radially. The speed of movement of the cylinder 13 may again be between 0.1 and 1.0 mm/s.

FIG. 5e corresponds to the end of the rise of the cylinder 13 when the lens 1 is pressed against the film 2 over the entire face S1. The second method of operation may then be continued in the same way as the first method of operation.

It should be understood that the numerical values indicated above in the detailed description of the invention according to two different methods of implementation have been given merely by way of illustration. In particular, the temperature and pressure difference values have to be adapted when the curvature of the face S1 of the lens 1 varies. Likewise, they must be adapted when the material and/or the thickness of the film 2 varies, according to the thermomechanical properties of this material.

It should also be indicated that the second method of operation described may be used when the face S1 of the lens 1 is concave. In this case, the underpressure $\Delta P_3$ is advantageously suitable for the film 2 to adopt an inverse curvature, which is slightly greater than that of the face S1 of the lens 1. Finally, it should also be understood that the invention may be implemented for substrates other than an ophthalmic lens. In particular, it may be used to bond a film to a measurement instrument lens or to an optical sight lens, to a mask glass, a window glass, etc.

The invention claimed is:

1. Method of bonding a film having a substantially plane initial shape to a curved face of a substrate, the method comprising the following successive steps:
   a) when the film is at a temperature above 40° C., holding firmly a peripheral edge of the film and applying a pneumatic pressure difference between two sides of the film until an application face of said film becomes curved with a curvature greater than an average curvature of the face of the substrate;
   b) when the temperature of the film has dropped below 40° C., adjusting the pneumatic pressure difference applied between the two sides of the film so that the curvature of the application face of the film becomes approximately equal to or less than the curvature of the face of the substrate; and
   c) while maintaining the pneumatic pressure difference adjusted at step b), pressing the fade of the substrate is pressed against the application face of the film until complete contact is established between the film and the face of the substrate, a layer of an adhesive being placed between the film and the substrate.

2. Method according to claim 1, in which step a) is carried out while simultaneously heating the film, and step b) is carried out when the temperature of the film is substantially equal to the ambient temperature.

3. Method according to claim 1, in which the temperature of the film during step a) is between 80° C. and 180° C.

4. Method according to claim 1, in which the pneumatic pressure difference applied in step a) between the two sides of the film is between 0.1 bar and 4.0 bar.

5. Method according to claim 1, in which the face of the substrate is convex and in which:
   in step a), the pneumatic pressure difference is applied between the two sides of the film so that the application face of the film becomes concave with a curvature greater than the curvature of the face of the substrate; and
   in step b), the pneumatic pressure difference applied between the two sides of the film is reduced so that the application face of the film remains concave and the curvature of said application face becomes less than the curvature of the face of the substrate.

6. Method according to claim 5, in which the pneumatic pressure difference applied between the two sides of the film after step b) is between 0.05 bar and 0.3 bar.

7. Method according to claim 1, in which, in step a), the pneumatic pressure difference is applied between the two sides of the film so that the application face of the film becomes concave with a curvature greater than the curvature of the face of the substrate and in which step b) comprises the following two substeps:
- b1) when the temperature of the film has dropped below 40° C., the pneumatic pressure difference applied between the two sides of the film is reduced so that the application face of the film remains concave and the curvature of said application face becomes substantially equal to the curvature of the face of the substrate; and then
- b2) the pneumatic pressure difference is modified by reversing the sign of said pneumatic pressure difference between the two sides of the film so that the application face of the film becomes convex.

8. Method according to claim 7, in which the face of the substrate is convex and in which the application face of the film becomes concave again when said face of the substrate is progressively pressed against said application face of the film in step c).

9. Method according to claim 7, in which the pneumatic pressure difference applied between the two sides of the film after step b1) is between 0.05 bar and 0.3 bar.

10. Method according to claim 7, in which the pneumatic pressure difference applied between the two sides of the film after step b2) is between 0.05 bar and 0.5 bar in absolute value.

11. Method according to claim 1, in which the layer of adhesive is arranged on the application face of the film before step c).

12. Method according to claim 1, in which the substrate comprises an optical lens.

13. Method according to claim 12, in which the substrate comprises an ophthalmic lens.

14. Method according claim 1, in which the film comprises a material based on polyethylene terephthalate, cellulose triacetate, polyvinyl alcohol, a polyimide, polyethylene naphthalate or polycarbonate.

15. Method according to claim 1, in which the film includes a functional coating on an external face of said film opposite from the application face.

16. Method according to claim 1, in which the film includes an array of cells juxtaposed parallel to one face of said film, neighbouring cells of said array being separated by walls substantially perpendicular to said face of the film.

17. Method according to claim 1, in which steps a) to c) are carried out using a device comprising:
- a sealed chamber provided with a system for fastening the peripheral edge of the film so as to hermetically seal said chamber with said film;
- means for heating the film fastened to the chamber and means for controlling the temperature of the film fastened to the chamber;
- means for varying the pneumatic pressure inside the chamber and means for controlling said pneumatic pressure relative to the pressure outside the chamber;
- a substrate support placed in the chamber; and
- means for moving the substrate support inside the chamber, which are designed to press the substrate against the film, in which steps a) and b) are carried out by actuating the means for varying and controlling the pneumatic pressure inside the chamber and step c) is carried out by actuating the means for moving the substrate support.

* * * * *